Aug. 14, 1956    W. SCHMIDT    2,758,921
REDUCING METAL COMPOUNDS WITH AMALGAM
Filed June 24, 1952
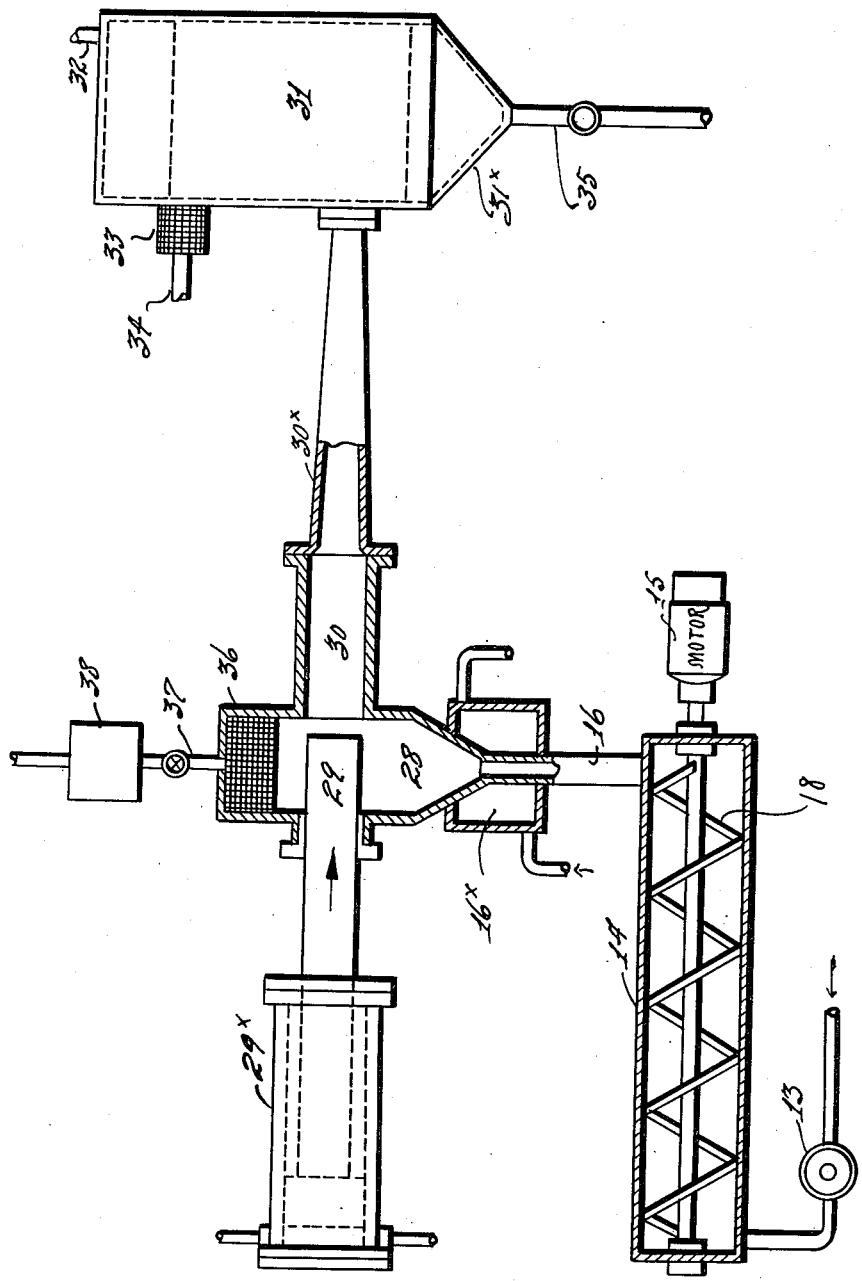
INVENTOR.
Walther Schmidt
BY H. Lee Helms
  Attorney Patent Office
2,758,921
Patented Aug. 14, 1956

2,758,921
REDUCING METAL COMPOUNDS WITH AMALGAM

Walther Schmidt, Richmond, Va., assignor to Reynolds Metals Company, Richmond, Va., a corporation of Delaware Application June 24, 1952, Serial No. 295,326

8 Claims. (Cl. 75—84.5)

The present invention relates to a process for preparing titanium and zirconium and alloys thereof. More particularly, this invention relates to the process of reducing a compound of one of said metals by amalgam metallurgy, an alkali or alkaline earth metal (including magnesium) in amalgamated form being the reducing agent, and then separating the reduced metal from the suspension thereof in mercury which has been formed.

An object of this invention is to provide a method for separating the titanium, zirconium or alloy thereof, from the mercury suspension formed in the reduction process, by a coalescence treatment, in which the suspension is maintained at a temperature high enough and for a time long enough for a crystalline phase containing the metal to form, said phase providing a size of crystalline particles which can be separated by means of their buoyancy in the mercury.

This and other objects of the invention will become apparent upon a reading of the following description, in connection with the accompanying drawing, which is a schematic view of the process of the invention.

The invention will be described with reference to the production of titanium from a halide thereof, e. g., one of the chlorides (preferably the tetrachloride), using sodium amalgam as the reducing material. The reduction step may be carried out by vaporizing the titanium tetrachloride in a pressure vessel heated to about 300° C., vaporizing a sodium amalgam of about .3% sodium content in a pressure vessel heated to about 400° C., and reacting the two vaporized constituents at a temperature of about 500°–700° C. The reaction mass from the reduction step will contain the reduced titanium, and also the sodium halide corresponding to the original titanium halide which has been reduced. The reduced titanium in the reaction mass is in the form of a suspension in mercury, due to the rather low solubility of titanium in the latter. The suspension initially formed is of fine crystals and is not easily separated from the reaction mass, especially in view of the large volume of sodium halide present. The use of aqueous means for dissolving said halide would result in oxidation of the fine titanium particles.

The titanium suspension is moved by pump 13 into vessel 14 for agglomeration and flotation of the crystals. This vessel preferably has two partitions: one where the agglomeration is effected, and another where the agglomerates are floated to a higher level of mercury. Since the temperature of agglomeration must be above the boiling point of mercury, vessel 14 is a pressure vessel. The temperature therein should be sufficiently high to provide a fairly rapid speed of crystallization or coalescence, for instance about 400–700° C. in the case of titanium. The coalescence step for titanium might be carried out, for example, in about 5 hours at about 600° C.

The agglomeration or coalescence by crystallization is explained by the formation of a crystalline phase comprised of inter-metallic compounds of the titanium with mercury. The mercury which enters the crystals adds to their bulk and thus promotes coalescence. It also renders the solution potential of the titanium less negative as compared with the uncombined metal. In addition, it improves the wettability of the coalesced particles by mercury, thus providing a surface maintaining almost the same over-voltage characteristics for the discharge of hydrogen ions as in the case of mercury alone. The use of aqueous means for dissolving the sodium halide is therefore made possible and the separation of the reduced titanium is greatly facilitated.

The higher level of mercury to which the coalescent crystals are floated is located in chamber 28. Tower 16 and the base of chamber 28 may be cooled by means of a heat exchanger 16x using, for example, air to effect a final mercury temperature in chamber 28 of about 300° C. Preferably the diameter of tower tube 16 is narrow to permit rapid loss of heat from the mercury suspension therein.

The crystals of titanium floating on the surface of mercury in chamber 28 are pushed by ram 29 operated by hydraulic press 29x into the tapered tube 30x. The tube 30x is connected to chamber 31. Because of the plugging of tube 30x by titanium crystals, liquid mercury cannot flow out of said tube. However, every stroke of the ram 29 pushes a given amount of titanium crystals into chamber 31 although tube 30x is always sealed against loss of mercury through this conduit. Water is introduced into chamber 31 through pipe 32 and said water is discharged from said chamber 31 through a filter 33 and conduit 34. The washed titanium crystals and any liquid mercury collected in the conical section 31x of chamber 31 are periodically removed through valved outlet 35. The crystals remaining in chamber 31 are ultimately dried, and then distilled to remove any adherent mercury thereon.

Liquid mercury is removed from the titanium crystals floating in chamber 28 by means of filter pump 36 through valved outlet conduit 37 into storage vessel 38. Liquid mercury having in suspension therein fine particles of titanium is cycled from storage chamber 38 back to the electrolysis cell. The chamber 28 need not be very distant in height from vessel 14 and the material in this space may be under the same pressure as in vessel 14, although the temperature in the chamber 28 is desirably considerably less than that of vessel 14. Also the temperature of the titanium crystals in plugging tube 30x is preferably below 100° C.

Alternatively the higher mercury level is at a temperature lower than the boiling point of mercury and yet high enough above the bottom of the reaction vessel so that the static pressure of the column of mercury above the bottom of the reaction vessel counteracts the vapor pressure of the mercury within the reaction vessel, where the temperature employed in the reaction is above the boiling point of mercury at normal atmospheric pressure. Discharge of the metal crystals is effected mechanically from the upper level of the mercury by skimming the surface and conveying the products to a final separation, wherein the sodium chloride is removed by a solvent such as water, and wherein any adherent mercury is subsequently distilled off.

When separating the metal crystals from mercury, a considerable amount of mercury can be removed by squeezing. For this purpose the mercury is squeezed to such an extent as to provide a compressed solid capable of being pushed from the level of mercury in the vessel, to which it has risen due to its buoyancy, exerting enough pressure to plug the outlet with the compressed crystals. This can be done by using a conical container of an extrusion press and pushing such portions continuously or intermittently into it, as to keep it filled or substantially filled, so that it becomes tightly plugged and does not allow any substantial leakage of liquid. Another feature of my invention is to push the materials into a tube which offers sufficient resistance or friction to form a plug by virtue of its length or taper, with the narrow end of the taper leading to a chamber wherein the metal crystals may be floated.

In order to counteract possible poison hazards, mercury is discharged into a distillation chamber or conveyed to a condenser wherever possible.

It is also possible to discharge the metal crystal suspension through an outlet into a vessel containing mercury under the mercury level, thereby allowing the suspended crystals of metal to rise to the surface and be removed mechanically from the mercury level.

Another variation is the discharge of the materials through the outlet into a vessel containing a solvent, such as water or depleted brine from the electrolysis process in which the amalgam was made, in which the sodium halide is soluble. The materials are preferably discharged underneath the surface of the aqueous solvent, followed by a water washing, and subsequent settling out of the desired metal together with any adherent mercury. The free desired metal is obtained by separating the water, drying, and then removing the mercury by distillation.

A modification of this discharge procedure involves pushing the material through the outlet into a vessel containing a molten salt or salt mixture, preferably of the same composition as contained in the materials discharged. If, for example, the reaction is performed with an amalgam containing sodium and magnesium, the discharged materials contain sodium chloride and magnesium chloride. This mixture can be made in a proportion to obtain a low melting point, for example, the eutectic mixture. This melting point is, however, above the boiling point of mercury so that when the material is discharged into the salt bath the mercury escapes and is condensed, and the desired metal settles out and can by this means be separated from mercury and the body of salt. The salt can be decanted or filtered, the desired metal being finally separated from adherent salt by use of a solvent, such as, water or depleted brine from the electrolysis in which the reducing amalgam was produced.

All these variations are means by which the hazards against escape of mercury out of the plugged outlet can be minimized, since the vapors are condensed and recovered. The seal of the outlet which is plugged with the discharged materials during the discharging operation, however, must be so tight that only small leakages can occur and a sudden blowout of the superheated mercury cannot happen. The plugging characteristics of the discharged materials can be measured by the resistance which they offer against being moved through the outlet. Therefore, the plugging of the discharge-outlet may be controlled by a switch operated by the resistance or friction of the plugging material in the outlet. The discharge or the stroke of the extrusion press may be stopped if the presure has dropped to a point insufficient to create the resistance or friction of a predetermined value, indicating that the plugging characteristics of the discharged materials are not sufficient to form a seal. This may happen when the size of the particles have not the necessary coarseness. In this case the discharge has to be stopped and the crystals have to be given more time and temperature to grow.

When sodium amalgam is used, the preferred concentration of the sodium is about .3% in mercury. It is a common knowledge that a higher concentration of sodium can only be obtained uneconomically, since above this concentration hydrogen begins to be liberated at the cathode. If this 0.3% sodium amalgam is used, e. g. to decompose titanium tetrachloride, the amount of titanium metal in the amalgam is about .15–20%. It is advisable to have the suspension of titanium and sodium chloride which is formed by the reaction washed with water or with depleted brine from the electrolysis of the sodium amalgam and to conduct both the brine and the suspension back to the electrolysis unit.

The suspension is thereafter filtered to remove whatever coarse metal particles may have formed during the reaction. This procedure is preferably repeated until a higher concentration of titanium is obtained, for instance, more than .5% titanium, or until the suspension becomes too viscous, or until under the condtions of electrolysis too much hydrogen is formed.

When water or brine is used for washing, the described method provides the formation of a coalesced product of metallic crystals which will be subject to oxidation very little as compared with non-treated particles.

The above described process may be employed for the production of zirconium as well as the titanium. If an alloy containing titanium or zirconium is desired, the initial reducing mixture may contain mixtures of the different alloy constituents, e. g. if an alloy containing titanium and chromium is desired, titanium tetrachloride and chromic chloride may be employed.

This invention has been described by means of a plurality of illustrative embodiments and modifications thereof but it is not to be limited to these disclosed embodiments.

Having described my invention, what I claim and desire to secure by Letters Patent, is as follows:

1. In a process in which titanium metal is produced by the reduction of at least one of its chlorides by means of an amalgam, containing reducing metals, the improvement which comprises using liquid amalgam containing both sodium and magnesium dissolved in mercury in quantitative proportions as to obtain as products of the reaction, besides titanium metal, sodium chloride and magnesium chloride in quantities approximately corresponding to the eutectic composition of the mixture of sodium chloride and magnesium chloride, the reaction being performed at a temperature above 430° C., the melting point of said salt mixture, up to 700° C., applying a pressure sufficiently high to keep the amalgam liquid, the temperature being maintained for a time sufficiently long to effect a coalesced crystalline phase containing particles of the titanium metal, and until the titanium particles rise to an upper mercury level of the vessel in which the reduction is effected, removing the floating products from said level separating titanium from the salt mixture and from mercury.

2. In a process for preparing a metal selected from the group consisting of titanium and zirconium, comprising the formation of a suspension of said metal in mercury, by the reduction of a halide of said metal, using for the reduction an amalgam, being at a temperature at least high enough to maintain said amalgam in the liquid phase, containing at least one reducing metal selected from the group consisting of alkali-metals and alkaline earth metals, including magnesium, dissolved in mercury, and in which the said reduced metal is separated from the said suspension, the improved step which consists in effecting a coalesced crystalline phase containing said reduced metal by heating the suspension in liquid mercury at a temperature about 400–700° C., applying a pressure sufficiently high to keep the mercury liquid at that temperature until the particles rise and form a buoyant layer thereof atop of the liquid, said layer being located sufficiently high that the static pressure of the column of mercury above the bottom of the vessel counteracts the vapor pressure of the mercury within the lower part of the vessel.

3. In a process for preparing metals selected from the group consisting of titanium and zirconium, comprising the formation of a suspension of said metal in mercury, by the reduction of a halide of said metal, using for the reduction an amalgam, being at a temperature at least high enough to maintain said amalgam in the liquid phase, containing at least one reducing metal selected from the group consisting of alkali-metals and alkaline earth metals, including magnesium, dissolved in mercury, and in which the said reduced metal is separated from the said suspension, the improved step consisting in effecting a coalesced crystalline phase containing said reduced metal by heating the suspension within liquid mercury at a temperature about 400–700° C., applying a pressure sufficiently high to keep the mercury liquid at that temperature until the particles rise and form a buoyant layer thereof atop of the liquid, moving the agglomerated particles from said upper level to at least one discharge outlet, squeezing most of the adhering mercury from said moved agglomerate, massing the discharge outlet with the agglomerates, and discharging said agglomerates from said outlet intermittently, but leaving at said outlet a proportion of massed agglomerates to provide a seal sufficiently tight to substantially prevent loss of mercury.

4. The process according to claim 3, wherein the discharged agglomerates are introduced into a vessel containing mercury, allowing said agglomerates to float to the surface, and thereafter removing the floated agglomerates.

5. The process according to claim 3, comprising controlling the massing of agglomerates at the discharge outlet by stopping the discharge of said agglomerates when the pressure required to overcome friction in the movement of the agglomerates has dropped below a predetermined value indicating that the plugging characteristics of the discharged agglomerates are not sufficient to form an adequate seal.

6. The process according to claim 3, modified by passing the discharged agglomerates which contain besides the reduced metal the halide of the reducing metal into a vessel containing a molten salt of the same composition as the halide of the reducing metal contained in the agglomerates discharged from the reaction-vessel, allowing the reduced metal particles to settle, condensing the vapors of mercury which escape from the molten salt, and separating the metal particles from the melt, and subsequently from adhering salt by means of a solvent therefor.

7. In a process for producing a metal of the group consisting of titanium and zirconium, by the reduction of a chloride of said metal, using for the reduction sodium-containing amalgam, thus forming a suspension of the reduced metal and sodium chloride in mercury, the improvement which comprises forming a coalesced crystalline phase by heating the suspension in liquid mercury at a temperature of about 400–700° C. while applying a pressure sufficiently high to keep the mercury liquid at that temperature, thereafter dissolving the sodium chloride from the reaction mass in sodium chloride brine, and then using the suspension as cathode in an electrolytical cell, in which sodium chlorine brine is decomposed.

8. In a process for preparing a metal selected from the group consisting of titanium and zirconium, comprising the formation of a suspension of said metal in mercury, by the reduction of a halide of said metal, using for the reduction an amalgam, being at a temperature at least high enough to maintain said amalgam in the liquid phase, containing at least one reducing metal selected from the group consisting of alkali-metals and alkaline earth metals, including magnesium, dissolved in mercury, and in which the said reduced metal is subsequently separated from the said suspension, during which separation an aqueous solvent is used for dissolving the halide of the reducing metal which has been formed simultaneously with the reduction, the improved step which consists in effecting a coalesced crystalline phase containing said reduced metal by heating said suspension in liquid mercury at a temperature about 400–700° C. for a time up to about five hours, thereby causing the formation of said coalesced crystalline phase, simultaneously applying a pressure sufficiently high to keep the mercury liquid at that temperature, then dissolving said halide of reducing metal by means of said aqueous solvent, and thereafter driving off mercury by distillation.

References Cited in the file of this patent

UNITED STATES PATENTS

| | | |
|---|---|---|
| 2,171,439 | Von Zeppelin | Aug. 29, 1939 |
| 2,182,567 | Mantell | Dec. 5, 1939 |
| 2,207,461 | Kemp | July 9, 1940 |
| 2,381,023 | Wulff | Aug. 7, 1945 |
| 2,391,903 | Johansson | Jan. 1, 1946 |
| 2,564,337 | Maddex | Aug. 14, 1951 |
| 2,618,549 | Glasser et al. | Nov. 18, 1952 |
| 2,618,550 | Hampel et al. | Nov. 18, 1952 |

FOREIGN PATENTS

| | | |
|---|---|---|
| 296,867 | Germany | Mar. 13, 1917 |